June 18, 1940.   R. S. NELSON ET AL   2,204,614
METHOD OF MAKING A HEAT EXCHANGER
Original Filed June 29, 1935
Fig. 1
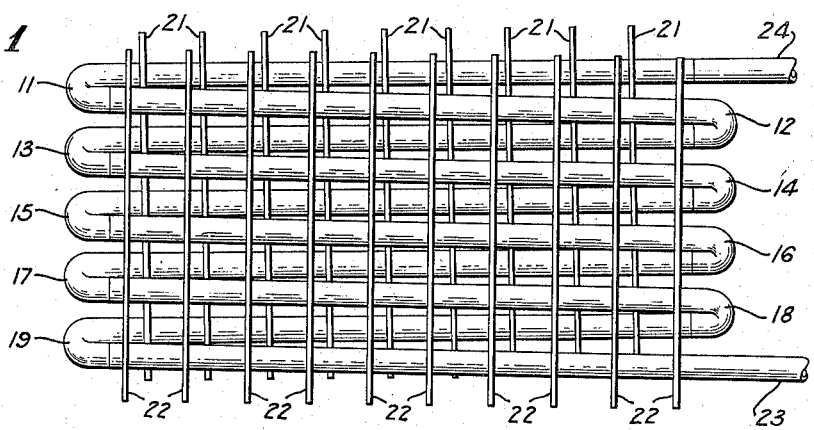
Fig. 2
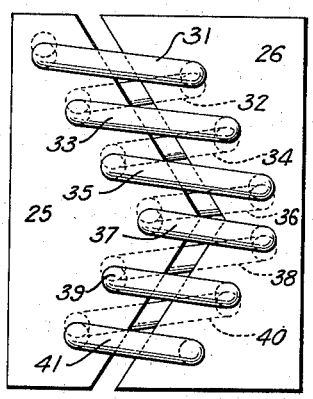
Fig. 3
Fig. 4
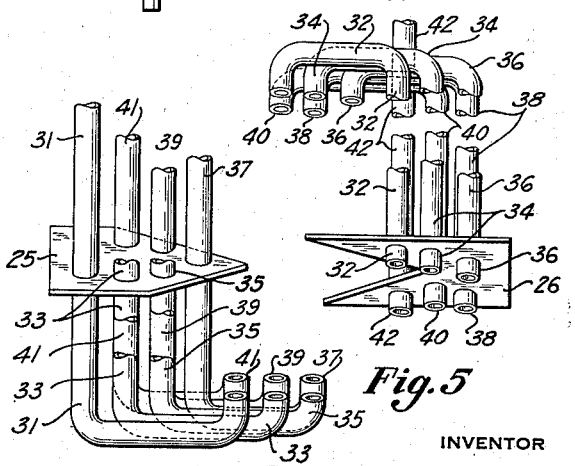
Fig. 5
INVENTOR
Rudolph S. Nelson
Arnold D. Siedle
BY
Harry S. Dumart
ATTORNEY Patented June 18, 1940

2,204,614

UNITED STATES PATENT OFFICE 2,204,614

METHOD OF MAKING A HEAT EXCHANGER

Rudolph S. Nelson, Larchmont, N. Y., and Arnold D. Siedle, Canton, Ohio, assignors to The Hoover Company, North Canton, Ohio, a corporation of Ohio Original application June 29, 1935, Serial No. 29,008. Divided and this application May 16, 1938, Serial No. 208,278

9 Claims. (Cl. 29—157.3)

This invention relates to a heat exchange device, and more particularly to a novel method of constructing and fabricating such a device.

This application is a division of our copending application for Letters Patent, Serial No. 29,008, filed on June 29, 1935.

The construction of a heat exchanger in large quantities from standard stock materials and in accordance with present day mass production methods presents several serious problems. This is especially true of heat exchange devices of the finned-tube type where a very large number of heat conducting fins must be placed on tubing in a uniform manner and in such a way as to insure a permanent bond of maximum heat conducting capacity.

Previous methods of construction involve either a large number of joints between individual sections of finned, straight sections of tubing, or the transfer of individual fins over long sections of tubing in which there are return bends. Both methods are obviously disadvantageous, the first method involving a large number of costly joints, and the second, an almost worthless bond between the fins and the tubing.

The present invention entirely avoids the disadvantages of prior known methods of constructing finned-tube heat exchangers, and at the same time provides a product which is much more economical to fabricate as well as one which is much more efficient in operation, all as will be more fully described hereinafter.

It is accordingly an object of the present invention to provide a new method of making a finned-tube type heat exchanger having a large amount of heat-radiating surface and wherein the heat-radiating surface is so arranged that heat is transferred more effectively between the device and the fluid passing thereover.

Another object of the invention is to provide a new method of constructing a finned-tube heat exchanger having a minimum number of joints and in which the fins are pressed axially along only straight sections of tubing.

A still further object of the invention is the provision of a mode of constructing a continuous, finned-tube heat exchanger in which straight portions of tubing are simultaneously passed through a plurality of heat-radiating fins and thereafter the tube ends are joined to another similar heat exchange assembly comprising at least one similarly finned straight portion of tubing and in such manner as to provide a continuous fluid passage through the tubing.

Another object of the invention is to provide a finned-tube heat exchanger in which a continuous fluid path is provided within the tubing which tubing is slightly inclined to the horizontal, and in which the fins are slightly inclined to the vertical so as to result in more intimate wiping contact between a vertically rising medium and said fins and thereby more efficient heat transfer.

A further object of the invention is a new mode of constructing a continuous, finned-tube heat exchanger having a minimum number of joints and in which all fins may be identical and in which the individual sections of tubing may be identical.

A still further object of the invention is the provision of a simpler, more efficient and less costly heat exchange device which is eminently adapted for mass production.

Other objects and advantages reside in certain novel features of the arrangement and construction of parts as will be apparent from the following description taken in connection with the accompanying drawing, in which Figure 1 is a side view of a coil of pipe constructed in accordance with the principles of the invention and illustrating one form thereof;

Figure 2 is an end view of the coil assembly shown in Figure 1, the view being taken from the left of Figure 1;

Figure 3 is a fragmentary plan view of the arrangement of Figures 1 and 2;

Figure 4 is an end view of a modified form of the invention; and

Figure 5 is a fragmentary perspective view of an assembly of pipes and heat-radiating plates used in the device of Figure 4.

In describing the structure shown in the drawing, it will be assumed that the device is to be used to discharge heat from a fluid therein to the atmosphere, as when used as an air-cooled condenser or absorber for refrigeration apparatus. It will of course be understood that the invention is intended for general application in exchanging heat between fluids flowing out of contact with one another.

Referring to the drawings in detail and first to the arrangement illustrated in Figures 1, 2 and 3, it will be seen that a coil assembly is shown as constructed of a number of pieces of pipe designated 11 to 19, inclusive, together with a number of heat-radiating plates or fins, the plates of one series being designated 21, and the plates of another series being designated 22. The pipes or sections of tubing 11 to 19 inclusive are somewhat similar in shape, each having a long straight portion with a hook or reverse bend at one end thereof. Hence, the individual sections may be said to comprise bent and unbent portions. It will be noted however that in the embodiment shown in Figure 1, the bends of certain of the pipes have different lengths than those of others of the pipes. As is best shown in Figures 2 and 3, the bends on the pipes or sections 12 and 16 are of the same length and are the shortest of any of those in the coil assembly. The pipes or sections 11, 13, 15, 17 and 19 have bends of the same length, these bends being slightly longer than those on sections 12 and 16. Sections 14 and 18 have bends of the same length, these being still longer than those on sections 11, 13, 15, 17 and 19.

The heat-radiating fins 21 and 22 are identical in construction. In the arrangement illustrated each is provided with five holes therein arranged in offset or staggered relation, three of the holes being near the lefthand edge of the fin as viewed in Figure 2, and two holes near the righthand edge thereof. In making up the coil the pipes or sections of the series 11 to 19, designated by the odd numerals are passed successively through the openings in the fins or plates 21, all of the hook-shaped or return bend portions being on one end, as the left end in Figure 1. Thus, the straight or unbent portion of section 11 is passed through the upper holes in the plates 21, the straight or unbent portion of section 13 is passed through the next lower holes in the plates 21, and so on.

Inasmuch as there are relatively few fins to be pressed upon a given straight portion of a given section, and since even the first fin is passed along the conduit for only a short distance, the bond between the fin and the conduit is so good that soldering, brazing or other positive bonding operations may not be necessary. Moreover, the openings in the fins are not distorted and enlarged as is the case where the fins are passed over bent portions of conduit as has been common practice heretofore.

Likewise conduit sections of the series 11 to 19 designated by the even numerals have their straight or unbent portions passed through openings in the plate 22, the bent portions of the sections being to the right of the assembly as viewed in Figure 1.

After the sections have been assembled in the plates 21 and 22 as indicated above, the end of each straight portion of a section is welded to that end of an adjacent section which is near a bent or return bend portion of said section. In the drawings, the welds are indicated as being merely butt welds, but it is obvious that one end of each pipe may be flared slightly to overlap the end of the succeeding pipe with which it is connected so that a lap weld can be made.

To complete the assembly a piece of straight pipe 23, which may be part of a refrigerating system, may be passed through the lower holes in the plates 22 and be secured as by a weld to the lower bent portion of section 19. Likewise a conduit, which may be part of the refrigerating system may be welded to the upper straight portion of the pipe 11, such a pipe being fragmentarily shown at 24 in Figures 1 and 3.

In assembling the sections those designated by the odd numerals are inclined downwardly slightly from right to left as viewed in Figure 1 while those designated by the even numerals are inclined downwardly slightly from left to right, so that as the sections are welded together a coil is formed in which a downward substantially uniform slope is provided throughout its entire length. In this connection it may be noted that the inclination of the bent portions of the sections to the horizontal may be and preferably is the same as that of the unbent portions. Because of the inclination of the pipes the heat radiating plates 21 and 22, which are disposed at right angles to the pipes passing through the holes therein are also disposed in an inclined position, the inclination of plates 21 being in opposite direction from the vertical, from the inclination of plates 22. Thus, when heat is discharged to the atmosphere from the coil and from the plates, air tends to rise vertically through the coil, but is deflected from the vertical by the inclined fins. Because of the continued tendency of the cooling air to rise vertically, it will be clear that the air passes in close wiping contact with the fins thereby providing highly efficient heat exchange.

A modified form of the invention is shown in Figures 4 and 5. In these figures the heat-radiating plates, only two of which are shown for simplicity in illustration, are formed by cutting a rectangular plate into two pieces so as to form complementary plates designated 25 and 26, the plate 25 having a V-shaped or triangular shaped righthand edge as viewed in Figure 4, while the plate 26 has a complementary depressed or recessed V-shaped lefthand edge.

As in the arrangement of Figures 1 to 3, the coil assembly of Figures 4 and 5 is made up from sections of conduit, designated 31 to 41 inclusive, which are straight or unbent for the major portion of their length and provided with hooks or bent portions on one of their ends. As shown in Figure 5, the bent portions of the sections may comprise return bends intermediate the ends of the sections. Hence, each section may consist of two straight or unbent portions interconnected by a bent or return bend portion.

Sections 31 to 41 inclusive may be divided into two groups, those which have long bends or hooks and those which have short ones. The pipes may be assembled from two different stocks, the sections 31, 33, 35, 38 and 40 each having long bends of the same length, while sections 32, 34, 36, 37, 39 and 41 each have bends of the same length and shorter than those of the first mentioned group. As in the arrangement previously described, the sections designated by the odd numerals of the series 31 to 41 are assembled with a number of plates 25 by passing the straight or unbent portions through holes in these plates. At the same time, the sections designated by the even numerals 32 to 40 are passed through holes in a number of plates 26. It will be noted that the holes in the plates 25 and 26 are disposed along the inner V-shaped edges thereof and at equal distances from these edges. The assembly of the sections and two of the plates is illustrated by the arrangement in Figure 5, it being understood that in this figure, while only one of each of the plates 25 and 26 is shown, a number would be employed in the complete assembly. As shown in Figure 5, the sections designated by the odd numerals 31 to 41 have their bent portions below the plate 25 while the sections designated by the even numerals 32 to 40 have their bent portions above the plate 26.

After the sections have been assembled with the heat-radiating plates, they are welded together to form a coil as described hereinabove in connection with the arrangement of Figures 1 to 3. Conduit 42, Figure 5, corresponds to conduit 23 of the embodiment shown in Figure 1.

Since each straight portion of the sections of the series 31 to 41 is inclined downwardly slightly to the horizontal plates 25 and 26 are inclined with respect to each other and each is inclined slightly to the vertical. This relationship is shown exaggerated in Figure 5 for purpose of illustration, the true inclination of the plates 25 and 26 in the completed assembly being somewhat similar to the inclination of the plates 21 and 22 in Figure 1. Because of the peculiar shape of the inner edges of the plates 25 and 26, the arrangement of Figures 4 and 5 has a particular advantage in that as heat is discharged from the coil and from the plates 25 and 26 to the atmosphere, air is caused to pass upwardly through the coil and in so doing, is deflected from one heat-radiating plate to the other, especially along the inner edges thereof, so as to cause air to come in heat transfer relation with these plates and with the coil.

From the above description, it will be clear that two forms of the invention have been illustrated in which a coil is assembled and constructed in a novel maner and in which a large heat-radiating surface has been provided. Such a coil could be used to particular advantage as a condenser in a refrigerating system. When so used, the gas to be condensed might be supplied to the upper end of the coil and as it condenses be drained away as a liquid through the lower connection thereto. The coil might be used as an absorber or other vessel of a refrigerating system also, or in any place where a transfer of heat to or from a fluid in the coil is desirable.

While only two embodiments of the invention have been shown and described herein, it is obvious that various changes may be made without departing from the spirit of the invention or the scope of the claims.

We claim:

1. The method of fabricating a continuous finned-coil heat exchanger comprising, placing return bend loops in one end of a plurality of similar conductors, dividing the conductors so formed into two substantially equal groups, inserting the unlooped ends of each group into snuggly fitting, staggered openings in a plurality of similar members of high heat conductivity, and joining the looped ends of one group with the unlooped ends of the other group in such manner as to form a continuous passage of varying elevation from the inlet to the outlet of the heat exchanger.

2. The method of fabricating a continuous, finned-coil heat exchanger comprising, placing return bend loops in one end of a plurality of similar conductors, dividing the conductors so formed into a plurality of substantially equal groups, inserting the unlooped ends of each group into openings in a plurality of closely spaced similar members of high heat conductivity, said members being common to the conductors of a given group of conductors, and joining the unlooped ends of one group with the looped ends of another group in such manner as to provide a heat exchanger having a continuous fluid passage of gradually varying elevation from one end thereof to the other.

3. The method of fabricating a continuous, coil heat exchanger comprising, forming return loop bends in one end of a plurality of conductors, dividing the conductors into a plurality of groups, inserting the unlooped ends of each group through snugly fitting staggered openings in a plurality of plates of high heat conductivity, the plates being positioned at right angles to the axis of the conductors, and joining the looped ends of one group of conductors with the unlooped ends of another group in such a manner as to provide a heat exchanger having a continuous passage of gradually varying elevation from one end thereof to the other and in which, in one position of the heat exchanger, all portions of the passageway are at a slight angle to a horizontal plane and the plane of the plates is at a slight angle to a vertical plane.

4. The method of making a heat transfer device adapted for use in a refrigerating system, the method including the steps of bending a number of straight pipes to provide hooks on one end of each, making a number of heat transfer plates with holes therein, the adjacent holes being staggered with respect to one another, passing the straight portions of one set of pipes through the holes in one set of plates so that the pipes are offset from one another, passing the straight portions of another set of pipes through the holes in another set of plates so that these pipes are also staggered with respect to one another and welding the ends of the straight portions of each set of pipes to the ends of the hooks on the other set of pipes to form a coil with heat transfer plates thereon.

5. The method of constructing a heat exchange device of the finned conduit type in which the individual fins are passed axially along tubing and in intimate heat exchange relation thereto, comprising piercing a plurality of fins of high heat conducting material with openings of a size slightly less than and a shape corresponding to the cross sectional area of tubing on which the fins are to be placed, cutting lengths of straight conduit into short sections, pressing a plurality of said fins along a plurality of said sections in spaced, parallel relation to one another, arranging said sections in side by side relation laterally of and generally parallel to one another with alternate sections inclined to the horizontal in one direction and the remaining sections inclined to the horizontal in the opposite direction, and joining the adjacent ends of said finned sections directly to one another so that the portions of the sections interconnecting the generally parallel portions of said sections are inclined slightly to a horizontal plane to provide a continuous fluid path from one eind of the conduit to the other which is inclined to the horizontal substantially uniformly throughout its length.

6. The method of construction a heat exchange device of the finned tube type comprising cutting a straight length of tubing into a plurality of short sections, placing a bend in one end of each of said sections, inserting a plurality of similar spaced-apart fins over said sections so that the fins are perpendicular to the axis of said sections, arranging said finned sections of tubing in side by side relation and generally parallel to one another, and joining the bent ends to the unbent ends of adjacent sections of tubing in such manner as to provide a single continuous downwardly inclined passage from one end of the heat exchange device to the other, said tubing sections being so disposed before being joined that alternate sections are inclined to the horizontal in one direction and the remaining sections are inclined to the horizontal in the opposite direction whereby the fins on alternate sections are inclined to the vertical in one direction and the remaining fins are inclined to the vertical in the opposite direction.

7. The method of constructing a heat exchange device of the finned conduit type in which the individual fins are passed axially along tubing and in intimate heat exchange relation thereto, comprising piercing a plurality of fins of high heat conducting material with openings of a size slightly less than and a shape corresponding to the cross sectional area of tubing on which the fins are to be placed, cutting lengths of straight conduit into short sections, bending the opposite ends of the short sections toward each other to form a return bend, pressing a plurality of said fins along the unbent portions of said sections in spaced, parallel relation to one another, arranging said sections in side by side relation so that the straight portions of said sections are positioned laterally of and generally parallel to one another with alternate straight portions of said sections inclined to the horizontal in one direction and the remaining straight portions of said sections inclined to the horizontal in the opposite direction, and joining the adjacent ends of said finned straight portions of the sections directly to one another so that the portions of the sections interconnecting the generally parallel portions of said sections are inclined slightly to a horizontal plane to provide a continuous fluid path from one end of the conduit to the other which is inclined to the horizontal substantially uniformly throughout its length.

8. The method of constructing a heat exchange device of the finned tube type comprising cutting a straight length of tubing into a plurality of short sections, placing a return bend intermediate the ends of each of said sections so that each section comprises two straight portions and a return bend portion, inserting a plurality of similar spaced-apart fins over straight portions of said sections so that the fins are perpendicular to the axis of said sections, arranging said finned sections of tubing in side by side relation and generally parallel to one another, and joining the end of one section to the end of an adjacent section of tubing in such manner as to provide a single continuous downwardly inclined passage from one end of the heat exchange device to the other, said tubing sections being so disposed before being joined that alternate straight portions of the sections are inclined to the horizontal in one direction and the remaining straight portions of the sections are inclined to the horizontal in the opposite direction whereby the fins on alternate straight portions of said sections are inclined to the vertical in one direction and the remaining fins are inclined to the vertical in the opposite direction.

9. The method of constructing a heat exchange device of the finned conduit type in which the individual fins are passed axially along tubing and in intimate heat exchange relation thereto, comprising piercing a plurality of fins of high heat conducting material with openings of a size slightly less than and a shape corresponding to the cross-sectional area of tubing on which the fins are to be placed, cutting lengths of straight conduits into short sections, bending the opposite ends of the short sections toward each other to provide two unbent portions and a return bend portion between the opposite ends of said sections, said unbent portions extending from said return bend portion at an angle to one another, pressing a plurality of spaced-apart, parallel heat dissipating fins axially along at least one of said unbent portions of each of said sections, said fins being positioned perpendicularly to said unbent portions, arranging said sections in side-by-side relation so that the unbent portions of said sections are positioned laterally of and generally parallel to one another with alternate, consecutive, unbent portions of said sections inclined slightly to the horizontal in one direction and the remaining alternate unbent portions of said sections inclined slightly to the horizontal in the opposite direction, and joining the adjacent ends of said unbent portions of the sections to one another to provide a single continuous coil heat exchanger having a continuous fluid path from one end of the conduit to the other which is inclined slightly and substantially uniformly to the horizontal throughout its length.

RUDOLPH S. NELSON.
ARNOLD D. SIEDLE.